(12) United States Patent
Wu et al.

(10) Patent No.: US 11,050,544 B2
(45) Date of Patent: Jun. 29, 2021

(54) METHOD FOR MAPPING MODULATION SYMBOLS ONTO RESOURCE UNITS OF ALLOCATED SUBFRAME

(71) Applicant: GUANGDONG OPPO MOBILE TELECOMMUNICATIONS CORP., LTD., Guangdong (CN)

(72) Inventors: Zuomin Wu, Guangdong (CN); Zhi Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/880,962

(22) Filed: May 21, 2020

(65) Prior Publication Data
US 2020/0287695 A1 Sep. 10, 2020

Related U.S. Application Data

(63) Continuation of application No. PCT/CN2019/076598, filed on Feb. 28, 2019.
(Continued)

(51) Int. Cl.
*H04L 12/28* (2006.01)
*H04L 5/00* (2006.01)
(Continued)

(52) U.S. Cl.
CPC ....... *H04L 5/0057* (2013.01); *H04W 72/0446* (2013.01); *H04W 72/0453* (2013.01)

(58) Field of Classification Search
CPC ... H04L 1/1861; H04L 5/0057; H04L 5/0067; H04W 72/0446; H04W 72/0453
(Continued)

(56) References Cited

U.S. PATENT DOCUMENTS

| | | | |
|---|---|---|---|
| 2014/0092842 A1* | 4/2014 | Ahn | H04W 74/08 370/329 |
| 2014/0286255 A1* | 9/2014 | Nam | H04L 27/2613 370/329 |

(Continued)

FOREIGN PATENT DOCUMENTS

| | | |
|---|---|---|
| CN | 1663213 | 8/2005 |
| CN | 1852073 | 10/2006 |

(Continued)

OTHER PUBLICATIONS

Huawei et al., "Remaining details for UL partial subframe transmission," 3GPP TSG RAN WG1 Meeting #92, R1-1801372, Feb. 2018, 7 pages.
(Continued)

*Primary Examiner* — John Pezzlo
(74) *Attorney, Agent, or Firm* — Hodgson Russ LLP (57) ABSTRACT

A method and a user equipment (UE) for modulation symbol mapping are provided. The method comprises mapping the CQI modulation symbols onto resource units of the second slot of the allocated subframe, wherein the CQI modulation symbols are mapped from the first resource unit of the second slot in a time-first mapping; and mapping the PUSCH modulation symbols onto resource units of both the first and second slot of the allocated subframe, wherein the PUSCH modulation symbols are mapped from the first resource unit of the first slot in a time-first mapping.

12 Claims, 7 Drawing Sheets

Related U.S. Application Data (60) Provisional application No. 62/636,451, filed on Feb. 28, 2018.

(51) Int. Cl.
*H04W 72/04* (2009.01)
*H04J 1/16* (2006.01)

(58) Field of Classification Search
USPC .................. 370/252, 329, 442, 430; 375/135
See application file for complete search history.

(56) References Cited

U.S. PATENT DOCUMENTS

| | | | |
|---|---|---|---|
| 2017/0289869 | A1 | 10/2017 | Nogami et al. |
| 2018/0110041 | A1* | 4/2018 | Bendlin .............. H04L 27/2613 |
| 2018/0167932 | A1* | 6/2018 | Papasakellariou .... H04L 1/1861 |
| 2019/0199477 | A1* | 6/2019 | Park ...................... H04L 1/0693 |

FOREIGN PATENT DOCUMENTS

| | | |
|---|---|---|
| CN | 102474400 | 5/2012 |
| CN | 102823179 | 12/2012 |
| CN | 102474400 | 10/2014 |
| CN | 106992847 | 7/2017 |
| WO | 2016119192 | 8/2016 |
| WO | 2017029192 | 2/2017 |
| WO | 2017049560 | 3/2017 |

OTHER PUBLICATIONS

Intel Corporation, "Remaining details on uplink starting and ending positions in a subframe for FS3," 3GPP TSG RAN WG1 Meeting 90bis, R1-1717326, Oct. 2017, 5 pages.
Sequans Communications, "On multiple starting and ending positions in LAA UL subframe," 3GPP TSG RAN WG1 Meeting #90, R1-1714003, Aug. 2017, 4 pages.
WIPO, ISR for PCT/CN2019/076598, dated Apr. 29, 2019.
LG Electronics, "Discussion on multiple starting and ending positions for LAA UL," 3GPP TSG RAN WG1 Meeting #92, R1-1802152, Mar. 2018, 4 pages.
EPO, Office Action for EP Application No. 19761369.8, dated May 13, 2020.
IPI, Office Action for IN Application No. 201917050975, dated Mar. 3, 2021.
CNIPA, First Office Action for CN Application No. 202010075570.2, dated Apr. 26, 2021.

* cited by examiner

METHOD FOR MAPPING MODULATION SYMBOLS ONTO RESOURCE UNITS OF ALLOCATED SUBFRAME

CROSS-REFERENCE TO RELATED APPLICATIONS

This application is a continuation of International Application No. PCT/CN2019/076598, filed on Feb. 28, 2019, which claims priority to U.S. Provisional Application No. 62/636,451, filed on Feb. 28, 2018, the entire disclosures of which are incorporated herein by reference.

TECHNICAL FIELD

The present invention generally relates to the field of uplink radio communication and, more particularly, to a method and a user equipment (UE) for modulation symbol mapping. More particularly still, example aspects herein relate to method(s) and a user equipment (UE) for mapping channel quality information, CQI, modulation symbols and a plurality of Physical Uplink Shared Channel, PUSCH, modulation symbols onto a subframe having a first slot and a second slot for transmission on at least one unlicensed carrier.

BACKGROUND

Originally, LTE was designed for licensed spectra where an operator may have an exclusive license for a certain frequency range. A licensed spectrum offers benefits since the operator may plan the network and control interference situations, but there is typically a cost associated with obtaining the spectrum license and the amount of licensed spectra is limited.

Unlicensed spectra, on the other hand, are open for anyone to use at no cost, subject to a set of rules, for example on maximum transmission power. Since anyone can use the spectra, the interference situation is typically much more unpredictable than for licensed spectra. Consequently, quality-of-service and availability cannot be guaranteed. Furthermore, the maximum transmission power is modest, typically, making it unsuitable for wide-area coverage. Wi-Fi and Bluetooth are two examples of communication systems exploiting unlicensed spectra in the lower-frequency range: 2.4 GHz or 5 GHz.

Therefore, in order to provide spectrum flexibility the evolution of LTE has extended the operation of mobile-communication networks into unlicensed spectra as a complement to licensed spectra, in particular to offer overall higher data rates and higher capacity in local areas. One option is to complement the LTE network with Wi-Fi, but higher performance may be achieved with a tighter coupling between licensed and unlicensed spectra.

LTE release 13 therefore introduced license-assisted access (LAA), where a carrier aggregation framework is used to aggregate downlink carriers in unlicensed frequency bands, primarily in the 5 GHz range, for example, with carriers also in licensed frequency bands. Mobility, critical control signaling, and services demanding high quality-of-service may rely on carriers in the licensed spectra while (at least parts of) less demanding traffic can be handled by the carriers using unlicensed spectra.

In this context, Release 13 increased the number of aggregatable carriers to 32, resulting in a maximum bandwidth of 640 MHz and a theoretical peak data rate around 25 Gbit/s in the downlink. One motivation for increasing the number of subcarriers is to allow for very large bandwidths in such unlicensed spectra. These trends continue in the development of the new 5th generation (5G) mobile communications standard.

One key feature of the 5G wireless access technology, known as new radio (NR), is a substantial expansion in terms of the range of spectra in which the radio-access technology can be deployed. Unlike LTE, where support for licensed spectra at, for example, 3.5 GHz and unlicensed spectra at, for example, 5 GHz are introduced, NR supports licensed-spectrum operation from below 1 GHz up to 52.6 GHz already from its first release, and extensions to unlicensed spectra are also planned. In particular, some of the higher frequency bands which NR is likely to address are unlicensed.

From the above, it can be seen that these two spectrum types have different benefits and drawbacks. They may therefore be combined so that licensed spectra are used to provide wide-area coverage and quality-of-service guarantees, while unlicensed spectra are used as a local-area complement to increase user data rates and overall capacity without compromising on overall coverage, availability, and reliability.

SUMMARY

The present invention provides a method and a user equipment (UE) for modulation symbol mapping for the case that one PUSCH TB includes multiple CBs.

In particular, the present inventors have devised a method for modulation symbol mapping. The method comprises the steps of mapping the CQI modulation symbols onto the resource units of the second slot of the allocated subframe, wherein the CQI modulation symbols are mapped from the first resource unit of the second slot in a time-first mapping; and mapping the PUSCH modulation symbols onto the resource units of both the first and second slot of the allocated subframe, wherein the PUSCH modulation symbols are mapped from the first resource unit of the first slot in a time-first mapping.

The present inventors have also devised a computer program comprising instructions, which, when executed by a mobile computing device, cause the mobile computing device to perform the above method.

The present inventors have also devised a non-transitory computer-readable storage medium storing the above computer program.

The present inventors have also devised a signal carrying the above computer program.

The present inventors have also devised a user equipment, UE, for a radio communications system. The user equipment comprises a memory, and a processor. The memory stores one or more computer programs that, when executed by the processor, cause the processor to execute operations in accordance with the above method.

The present inventors have also devised a user equipment, UE, for modulation symbol mapping. The user equipment comprises a transmitting/receiving section, a memory, and a control section. The control section is configured to map the CQI modulation symbols onto resource units of the second slot of the allocated subframe, wherein the CQI modulation symbols are mapped from the first resource unit of the second slot in a time-first mapping; and map the PUSCH modulation symbols onto the resource units of both the first and second slot of the allocated subframe, wherein the PUSCH modulation symbols are mapped from the first resource unit of the first slot in a time-first mapping.

BRIEF DESCRIPTION OF THE DRAWINGS

Embodiments of the invention will now be explained in detail, by way of non-limiting example only, with reference to the accompanying figures, described below. Like reference numerals appearing in different ones of the figures can denote identical or functionally similar elements, unless indicated otherwise.

FIGS. 6A to 6D are schematic illustrations showing a method for modulation symbol mapping, according to example aspects herein.

DETAILED DESCRIPTION

Example embodiments of the present invention will now be described in detail with reference to the accompanying drawings.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

One characteristic of operation in unlicensed spectra is a fair sharing of unlicensed spectra with other operators and other systems, for example Wi-Fi. There are several mechanisms that can be used to enable this. By way of example, dynamic frequency selection (DFS), where the network node (for example, a DFS-enabled access point) searches and finds a part of the unlicensed spectra with low load, can be used to avoid other systems if possible. Further, the Listen-before-talk (LBT) mechanism, where the transmitter ensures that there are no ongoing transmissions on the channel prior to transmitting, is another such mechanism. In the development of NR, LBT has, in particular, been relied upon to control interference and to ensure that channels in the unlicensed spectra are shared fairly between devices of various operators (for example, LTE, LTE-A, and 5G devices), Wi-Fi devices, and other systems (for example radar).

In general, a device (for example, a radio base station (eNB) or a user equipment (UE)) operating in unlicensed spectra is required to perform LBT for a given channel. The LBT mechanism enables a device to apply clear channel assessment (CCA) to identify other transmissions in the channel (that is, "listening") prior to transmitting on that channel (that is, "talking"). As example, there are two LBT categories. In the first LBT category, the device may be required to perform CCA and/or transmission at fixed times only. In particular, CCA may be performed during an observation slot, that is, a period during which the operating channel is checked for the presence of other devices.

The device may be required to check for the presence of another device operating on the channel based on a detected signal level of that other device. This mechanism may be referred to as energy detect and, in general, requires determining whether the detected signal level of another device operating on the channel exceeds a predetermined threshold, such as an energy detection threshold.

In a case where the detected signal level exceeds the predetermined threshold, the device determines that the channel is busy or unavailable and does not perform transmission. This situation may be referred to as LBT unsuccess or LBT failure. In a case where a device fails to perform transmission, the device may continuously monitor the channel until the channel becomes available.

If it is determined that the channel is available (that is, the device does not detect a signal level of another device that exceeds the predetermined threshold), the CCA mechanism may allow the device to immediately begin transmission.

In the second LBT category, the device may have back-off mechanism when performing CCA. Or the device may have to observe an amount of CCA slots idle before it determines that the channel is available. The device may be required to back off (that is, not to perform transmission) for a random amount of CCA slots. The random amount of CCA slots may, for example, be an integer multiple of the observation slot and be determined according to the transmission priority. The case in which a device performing CCA determines that the channel is unavailable, may, as described above, be described as LBT unsuccess or LBT failure. In the case of LBT unsuccess, the device may continuously monitor the channel until the channel becomes available.

If, the random amount of CCA slots are clear, then the channel is clear (available), the device may then perform transmission. In contrast, if, at least one of the random amount of CCA slots are not clear, the channel is unavailable, the device fails to perform transmission. This situation may also be referred to as LBT unsuccess or LBT failure and, as discussed above, the device may (further) continuously monitor the channel until the random amount of CCA slots are clear and the channel becomes available.

Figure 1:
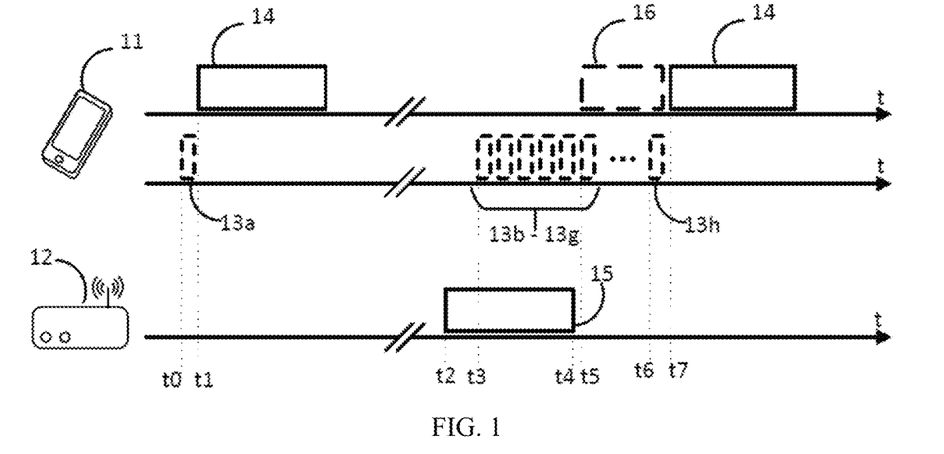
FIG. 1 is a schematic illustration showing how a listen-before-talk mechanism may be performed, according to an example aspect herein.

FIG. 1 is a schematic illustration showing how a listen-before-talk mechanism may be performed, according to an example aspect herein. At time t0, UE 11 performs the first LBT category, performs CCA during observation slot 13a and determines that wireless access point 12 (an example of a Wi-Fi device) is not operating on a channel. As the channel is available, in accordance with the CCA mechanism, UE 11 begins transmission (on an unlicensed carrier) on the channel at time t1, as indicated by reference numeral 14.

At time t2, UE 11 has been indicated to perform the second LBT category and wireless access point 12 begins transmission on the channel, as indicated by reference numeral 15. At time t3, UE 11 performs CCA during observation slot 13*b* and determines that wireless access point 12 is operating on the channel. Following LBT unsuccess, UE 11 continuously monitors the channel during observation slots 13*c* to 13*f* until the wireless access points ends its transmission and the channel becomes available at time t4.

At time t5, UE 11 performs CCA during observation slot 13*g* and determines that wireless access point 12 is not operating on the channel and backs off for a random period 16. At time t6, UE 11 performs CCA again, during observation slot 13*h* and determines that the channel is still available. Accordingly, at time t7, UE 11 begins transmission (on an unlicensed carrier) on the channel, as indicated by reference numeral 14.

In the deployment of LTE/NR on unlicensed carriers/spectrum, a UE may be triggered to transmit uplink control information (UCI) along with user data on the Physical Uplink Shared Channel (PUSCH) on one subframe. Such a case may occur, for example, if a UE is to transmit UCI on a Physical Uplink Control Channel (PUCCH) during a time interval that overlaps with a scheduled PUSCH transmission on the same carrier, the UE may instead multiplex the UCI onto the PUSCH. Thus, if the UE is transmitting on the PUSCH, the UCI is multiplexed with data on the granted resources (for example, an allocated subframe) instead of being transmitted on the PUCCH.

UCI transmitted on the PUSCH or PUCCH may, for example, include one or more of a scheduling request (SR), an acknowledgement (ACK) or negative acknowledgement (NACK) for a hybrid automatic repeat request (HARQ) mechanism, a channel quality indicator, a precoding matrix indicator, and a rank indication.

Typically, channel quality indicator and/or precoding matrix indicator can be denoted as channel quality information, CQI.

As discussed above, where the UE is configured to operate both on licensed and unlicensed spectra, the UE may be indicated to perform the first LBT category or the second LBT category in order to transmit at fixed times (candidate starting points). By way of example, a radio frame may contain a predetermined number of slots organized into subframes, and the UE may be configured to perform listening or transmission only at the beginning of a frame, only at the beginning of a subframe, only at one or more predetermined slots of a frame, etc.

In a case where the UE is configured to transmit UCI on the PUSCH, the UE may have two candidate starting points for PUSCH transmission in order to improve the channel access possibility in case the first candidate starting points is failed due to LBT unsuccess. The candidate starting points may be at a boundary of a slot or, alternatively, at any point during a slot.

Having the flexibility of starting a data transmission at any point during a slot and not only at the slot boundaries may be useful when operating in unlicensed spectra. In particular, once the unlicensed channel is found to be available it may be beneficial to start the PUSCH transmission immediately or at the next symbol boundary, rather than wait until the start of the slot, in order to avoid another device initiating a transmission on the PUSCH subframe. By contrast, if it is necessary to wait until the start of a slot boundary in order to perform transmission, some form of dummy data or reservation signal may need to be transmitted on the channel from the time of a successful LBT operation until the start of the slot. Such an approach may thus degrade the transmission efficiency of the system.

In a case where the UE is configured to transmit UCI along with user data on one subframe on the PUSCH, UCI may be considered to have a higher priority than user data. By way of example, CQI that are scheduled to be transmitted on a particular subframe should always be mapped to the second slot of the subframe, regardless of whether the actual transmission is from the first candidate point or second candidate points. Furthermore, following the legacy principle, user data (e.g. in the form of modulation symbols) should be mapped starting from the second slot, and then to the first slot, after CQI mapping is finished. Such a mapping dictates an order of transmission.

Data to be transmitted as PUSCH information bits on the PUSCH is provided to the lower layers of a UE from the upper layers of the UE in the form of transport blocks (TB). TBs are generally segmented into one or multiple smaller code blocks (CBs) to reduce memory requirements when encoding the data in the TB for transmission. A TB may also comprise a single CB. CBs are generally encoded in such a manner that the TB can be successfully decoded if, in a case where there are multiple CBs, at least a part of each CB or all of each CB is correctly received or if, in a case where there is a single CB, at least part of that CB or all of that CB is correctly received.

Following a PUSCH mapping of the kind set out above, if PUSCH carries a TB including multiple CBs, any CBs mapped only to the first slot of the subframe will be totally dropped (that is, not transmitted) in the case in which transmission is started from the second candidate starting point. As a result, the base station (eNB) that receives the TB transmitted by the UE may be unable to decode the entire TB due to the non-transmission of one or more CBs. Furthermore, if PUSCH carries a TB including a single CB and the CB is mapped only to the first slot of the subframe, then the TB will be totally dropped (that is, not transmitted) in the case in which transmission is started from the second candidate starting point.

Figure 2:
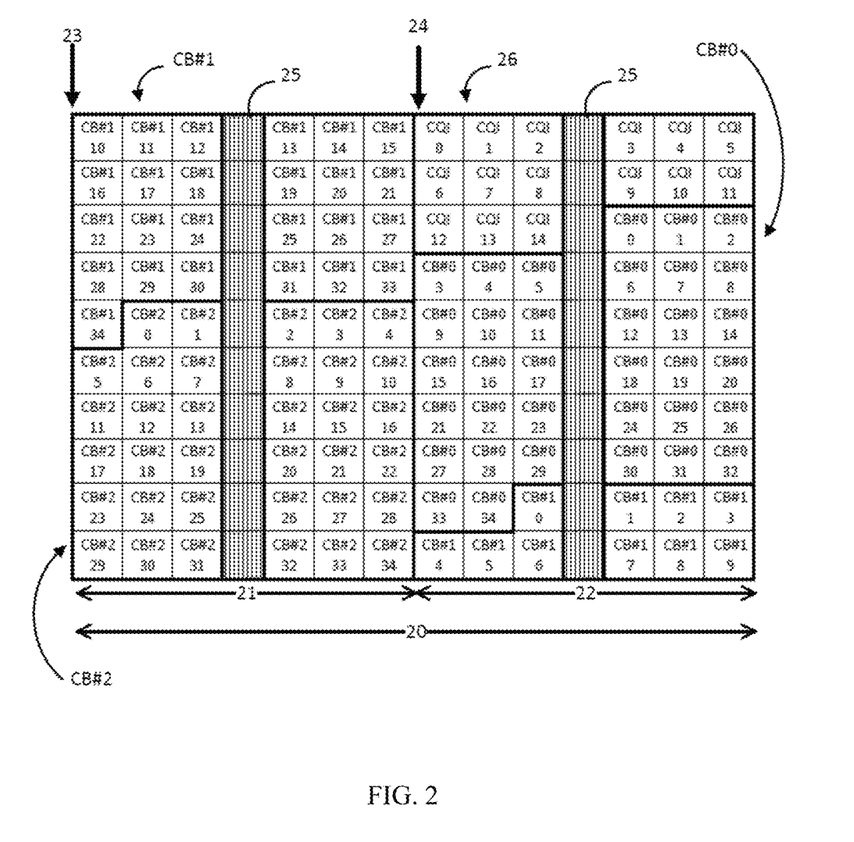
FIG. 2 is a schematic illustration showing how CQI modulation symbols and PUSCH modulation symbols may be mapped onto resource units of an allocated subframe having a first and second slot for transmission on at least one unlicensed carrier, according to a conventional approach.
Figure 3A:
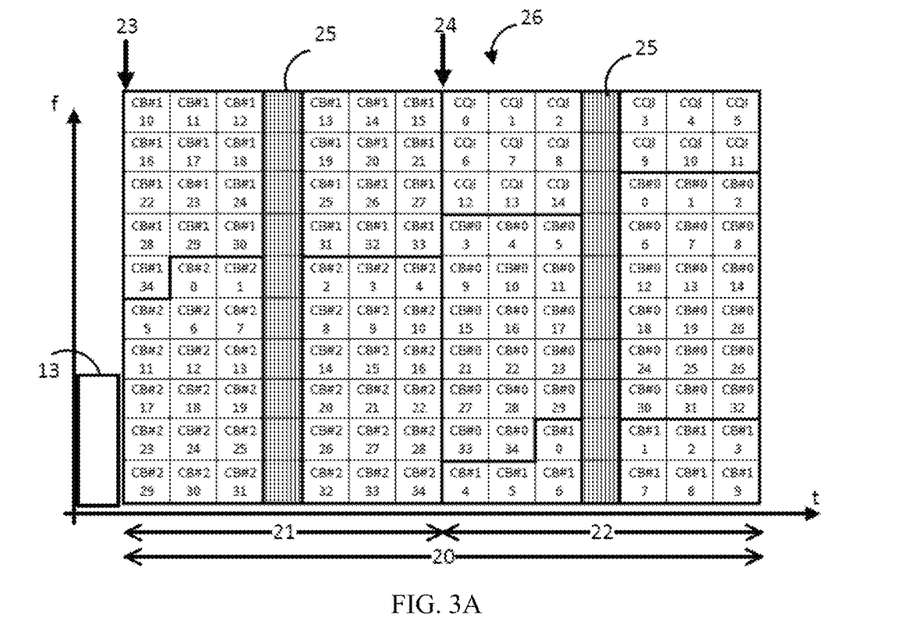
FIGS. 3A and 3B are schematic illustrations showing how an entire code block of the PUSCH may not be transmitted in a case where the UCI and code blocks are mapped according to the conventional approach of FIG. 2 and transmission starts from a second candidate starting point.
Figure 3B:
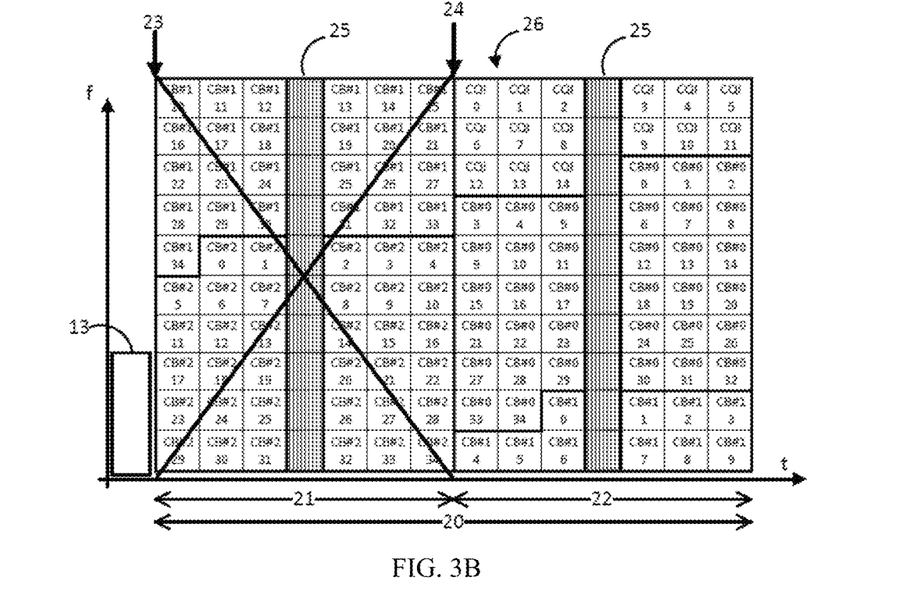

FIGS. 2, 3A and 3B illustrate an example of this issue in a case where a TB comprises three CBs. The characters in the figure represent the mapping sequence.

In particular, FIG. 2 is a schematic illustration showing how UCI (using the example of CQI) and user data in the form of a plurality of PUSCH CBs, CB #0, CB #1 and CB #2, may be mapped onto a subframe 20 having a first slot 21 and second slot 22 for transmission on an unlicensed carrier, according to a conventional approach.

Note that the illustrated mapping is performed before applying a Discrete Fourier Transform (DFT) if there is any DFT operation. In particular, in LTE and later systems, legacy CQI and PUSCH multiplexing transmission may include, for example, the following processing steps:

Coding CQI information bits and user data in the form of PUSCH information bits separately in order to obtain CQI coded bits and PUSCH coded bits. CQI coded bits and PUSCH coded bits are multiplexed by first placing the CQI coded bits and then placing the PUSCH coded bits in a bit stream.

Scrambling the bit stream by inputting the bit stream comprising the multiplexed CQI and PUSCH coded bits to a channel interleaver. The channel interleaver maps the bit stream to a matrix of resource units corresponding to the resource elements of the uplink resource grid. Accordingly, in conjunction with the resource element mapping, the channel interleaver implements a time-first mapping of modulation symbols onto the transmit waveform, as discussed below:

Modulating the output bits of the channel interleaver to generate modulation symbols;

Generating complex-valued symbols by applying a Discrete Fourier Transform (DFT) to the modulation symbols using a transform precoder; and Mapping the complex-valued symbols to resource elements.

Accordingly, the illustrated mapping may be that performed by the channel interleaver.

In the example shown, the illustrated matrix corresponds to a subframe 20 that is part of an uplink resource grid and comprises resource elements, (that is time and frequency resources which may be allocated for uplink transmission). Each resource element in the subframe 20 is represented by a respective resource unit of the illustrated matrix. According to 4G and 5G communication standards, a resource element (RE) is the smallest unit of the resource grid made up of one subcarrier in frequency domain and one OFDM symbol in time domain. In the present example, the subframe 20 is a subframe comprising two slots 21 and 22, each of which comprises 7 symbols in time domain and 10 subcarriers or resource elements in the frequency domain. It should be noted that the frequency resources allocated for uplink transmission should, for example, be an integer multiple of resource block (RB), one RB comprising 12 subcarriers or resource elements in the frequency domain. Here we use 10 subcarriers in frequency domain is only to illustrate the schemes.

As shown in FIG. 2, a PUSCH Demodulation Reference Signal (DMRS) 25 may be transmitted in the resource elements allocated to a user in the fourth symbol of each slot and therefore, for both slots 21 and 22, DMRS is shown as mapped to the fourth resource unit of each row of the illustrated matrix. Accordingly, the number of resource units of the matrix to which CQI and user data may be mapped (and thus the number of resource elements to which modulation symbols may be subsequently mapped) is 10*12=120. The number of bits of the bit stream mapped to each resource unit corresponds to the modulation order of the subsequently generated modulation symbols. For example, in a case where the modulation order is 4 (i.e. 16QAM is used), four bits are mapped to each resource unit which corresponds to one modulation symbol being subsequently mapped to each resource element.

The first candidate starting point 23 is at the start of the first slot 21 (that is, a first boundary of the first slot 21 in the time domain) and the second candidate starting point 24 is at the start of the second slot 22 (that is, a first boundary of the second slot 22 in the time domain).

UCI 26, in the form of a CQI in the present example, is mapped from a first unit, of the second slot 22 in a time-first mapping (that is, an order) which first follows a time direction of the second slot 22 and then follows a frequency direction of the allocated frequency resource of the second slot 22. After UCI mapping in this order is finished (in the example of FIG. 2 for CQI_0, . . . , CQI_14), the PUSCH modulation symbols (in this case, units of four coded bits) of PUSCH CBs, CB #0, CB #1 and CB #2 are mapped from a first available resource unit of the second slot in a time-first mapping which first follows the time direction of the second slot 22 and then follows the frequency direction of the allocated frequency resource of the second slot 22, until a modulation symbol has been mapped to each resource unit of the second slot 22. The remaining modulation symbols of the PUSCH CBs, CB #0, CB #1 and CB #2, in the example of FIG. 2 for CB #1_10, . . . , CB #2_34, are then mapped from a first resource unit of the first slot 21 in a time-first mapping which first follows a time direction of the first slot 21 and then follows a frequency direction of the allocated frequency resource of the first slot 21, until mapping of the entire PUSCH CBs, CB #0, CB #1 and CB #2, is completed.

As shown in FIG. 2, according to this conventional approach, the third PUSCH CB CB #2 is mapped entirely to the first slot 21.

FIGS. 3A and 3B are schematic illustrations showing how an entire code block CB #2 may not be transmitted in a case where the UCI and code blocks are mapped according to the conventional approach of FIG. 2 and transmission starts from a second candidate starting point 24.

In particular, FIG. 3A shows a situation in which, during an observation slot 13, it is determined that the channel is available. In this example, a CCA mechanism is used so transmission of the first slot 21 begins at the first candidate starting point 23 without a random back-off period. However, as shown in FIG. 3B, in a case where it is determined that the channel is not available during observation slot 13, data mapped to the first slot 21 is not transmitted. Even if, in a subsequent observation slot (not shown) it is determined that the channel is available and transmission begins (only) at the second candidate starting period 24, transmission will start only from the second slot 22. As a result, data mapped to the first slot will not be transmitted.

As noted above, all the user data of the third PUSCH CB CB #2 would be mapped to the first slot 21. Therefore, the entire third PUSCH CB CB #2 will not be received and decoded. As many widely used coding strategies, such as turbo coding, require all the CBs are correctly decoded so that the whole TB may pass the cyclic redundancy check, it is likely that the non-transmission of one CB will prevent the entire TB from being decoded correctly by the receiving device. While the example of FIGS. 2, 3A and 3B illustrate this issue in relation to a TB segmented into multiple CBs, this issue may also arise where the TB comprises a single CB.

As such there is a need in the art to develop better mapping methods.

Figure 4:
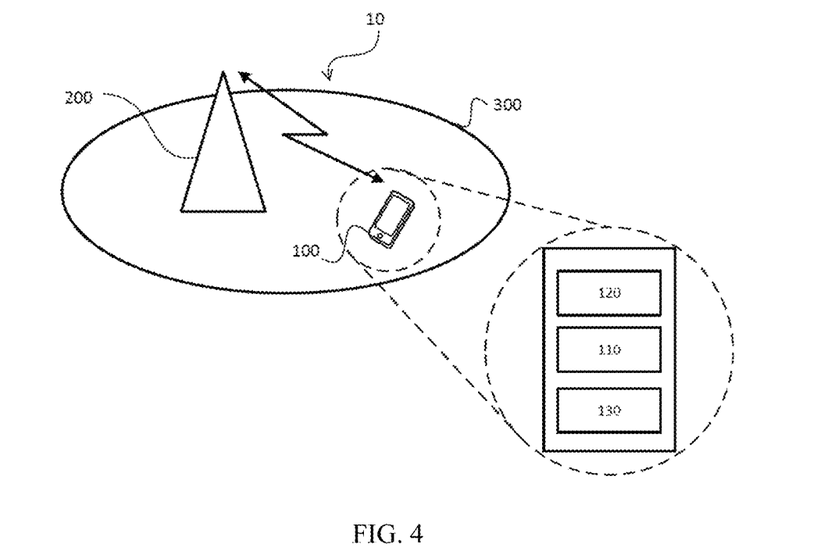
FIG. 4 is a schematic illustration of radio communications system, according to an example aspect herein.

FIG. 4 is a schematic illustration of radio communications system 10 according to an example aspect herein. The radio communications system 10 comprises a user equipment (UE) 100 and radio base station 200. UE 100 is in radio communication with radio base station 200. Radio base station 200 may, as in the present embodiment, be a LTE-A eNodeB. Alternatively, the radio base station may be, for example, a 5G gNB (next generation NodeB).

Radio base station 200 provides access to a radio communications network for UE 100 in cell 300, for example via beamforming. In the example shown in FIG. 1, the radio base station 200 serves a single UE 100. However, in alternative embodiments, the radio base station 200 may provide service to multiple UEs.

UE 100 (which may be configured not to transmit PUSCH and PUCCH simultaneously) may, as in the present embodiment, be configured to transmit user data in the form of PUSCH modulation symbols and/or UCI (such as, for example, CQI) modulation symbols to the radio base station 200 on the PUSCH and/or to transmit UCI to the radio base station 200 on the PUCCH. The UE 100 may, as in the present embodiment, also be configured to perform transmission to the radio base station 200 on other channels and/or to receive information transmitted by the radio base station 200 on downlink channels.

The UCI may, as in the present embodiment, comprise channel quality information, CQI, for example, one or more of channel quality indicator and/or one or more of precoding matrix indicator. Alternatively, the UCI may comprise, by way of example, at least one of a SR; a HARQ ACK or a HARQ NACK; a channel quality indicator, a precoding matrix indicator, and a rank indication.

UE 100 may, as in the present embodiment, comprise a control section 110, a transmitting/receiving section 120 and a memory 130. UE 100 may map channel quality information, CQI, modulation symbols and PUSCH modulation symbols onto resource units of an allocated subframe 20 (shown in FIGS. 6A to 6D) having a first and second slot 20, 21 (shown in FIGS. 6A to 6D) for transmission on at least one unlicensed carrier. By way of example, the mapped CQI modulation symbols and PUSCH modulation symbols may be transmitted on a single unlicensed carrier. Alternatively, the mapped CQI modulation symbols and PUSCH modulation symbols may be transmitted on multiple unlicensed carriers.

In general, mapping modulation symbols (for example, UCI and/or user data of a CB or TB) to an allocated subframe 20 may, as in the present embodiment, comprise allocating at least one frequency resource of the allocated subframe 20. The allocated frequency resource is an integer multiple of resource block (RB) and is representative of, for example, an integer multiple of resource element, RE, of that allocated subframe in the uplink resource grid to be used when transmitting the PUSCH. A matrix of resource units corresponding to the allocated resource elements of the allocated subframe is assumed for modulation symbols mapping, for example, the row of the matrix corresponding to the allocated subcarriers of the allocated subframe, the column of the matrix corresponding to the allocated data symbols of the allocated subframe. Typically, a resource unit may be considered to be available if a modulation symbol has not been mapped thereto and/or the resource unit is not reserved for specific information (such as DMRS or the like).

The control section 110 may map the CQI modulation symbols onto resource units of the second slot 22 of the allocated subframe 20, wherein the CQI modulation symbols are mapped from the first resource unit of the second slot 22 in a time-first mapping. The CQI modulation symbols may, as in the present embodiment, be mapped in a time-first mapping which first follows a time direction of the second slot 22 and then follows a frequency direction of the allocated frequency resources of the allocated subframe 20. That is the resource amount of CQI modulation symbols is mapped across the second slot 22.

The control section 110 may further map the PUSCH modulation symbols onto the resource units of both the first and second slot 21, 22 of the allocated subframe, preferably according to a second time-first mapping which is different from the first time-first mapping.

In particular, the PUSCH modulation symbols may, as in the present embodiment, be mapped from the first resource unit of the first slot in a time-first mapping which first follows the time direction of both the first and second slot and then follows the frequency direction of the allocated frequency resource of the allocated subframe. For example, the second time-first mapping may be an order which starts at the first resource unit of the first slot and first follows the time direction of both the first and second slot 21, 22 and then follows the frequency direction of the allocated frequency resources of the allocated subframe 20 (while skipping resource units used for UCI mapping in the second slot 22), i.e. across the entire subframe. Other preferred embodiments of the second time-first mapping will be illustrated below.

In order to ensure that the radio base station 200 able to correctly decode CQI modulation symbols and PUSCH modulation symbols of one or more CBs transmitted by the UE 100, the control section 110 of the UE 100 may be configured to map the CQI modulation symbols and PUSCH modulation symbols onto a subframe 20 using a mapping that is known to the radio base station 200. By way of example, the radio base station may, as in the present embodiment, be configured to transmit, to the UE 100, information indicative of the first time-first mapping and the second time-first mapping to be used in mapping the CQI modulation symbols and PUSCH modulation symbols at some time prior to the UE 100 performing uplink transmission. The radio base station 200 may, as in the present embodiment, be configured to transmit this information on, for example, the PDCCH. Alternatively, the radio base station 200 may be configured to transmit this information or using higher layer signaling. Furthermore, the radio base station 200 may be configured to transmit information indicative of the first time-first mapping and the second time-first mapping to be used in mapping to all UEs in the cell 300 or the radio base station 200 may be configured to transmit information indicative of different respective first and second time-first mappings to be used in mapping to each UE in the cell 300.

By way of alternative, the radio base station 200 and the UE 100 may determine the mapping to be used by the UE 100 in any suitable manner known to those skilled in the art.

The control section 110 and transmitting/receiving section 120 may be configured to perform any further processing necessary for transmission of the CQI modulation symbols and PUSCH modulation symbols, including, for example, those discussed above in relation to FIG. 2. The transmitting/receiving section 120 may, as in the present embodiment, be configured to transmit the CQI modulation symbols and PUSCH modulation symbols on the PUSCH after they have been mapped to the subframe 20.

The memory 130 may be configured to store the UCI and user data prior to processing this information, as well as to store CQI coded bits and PUSCH coded bits and/or CQI modulation symbols and PUSCH modulation symbols prior to transmission. The memory 130 may be further configured to store computer instructions which, when executed by the control section, cause the control section to operate as described above.

Figure 5:
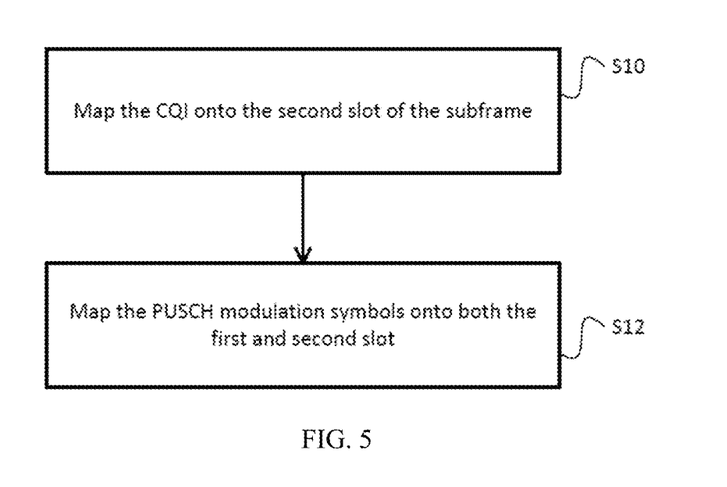
FIG. 5 is a flow diagram illustrating a method for modulation symbol mapping, according to an example aspect herein.

FIG. 5 is a flow diagram illustrating a method for modulation symbol mapping, according to an example aspect herein.

In process S10 of FIG. 5, the control section 110 of UE 100 maps the CQI modulation symbols onto the resource units of the second slot 22 of the allocated subframe 20, wherein the CQI modulation symbols are mapped from the first resource unit of the second slot 22 in a time-first mapping.

In this context, mapping information in an time-first mapping may comprises mapping information in an order which first follows the time direction of a slot and then follows the frequency direction of allocated frequency resource of the allocated subframe 20. Such a time-first mapping may, as in the present embodiment, comprise:

mapping a first part (by way of example, a predetermined number of bits or bytes, which may be selected based, for example, on the modulation order to correspond to a modulation symbol) of the information to a first resource unit on a first row (which may correspond to, for example, a RE on a first (unlicensed) subcarrier in the allocated frequency domain of the allocated subframe 20) of the slot in the time domain;

mapping each subsequent part of the information to a respective subsequent resource unit on the first row of the slot in the time domain; and once, each resource unit on the first row of the slot has had a part of the information mapped thereto, mapping, for each subsequent row of the subframe 20, a part of the information to each resource unit of the slot on that subsequent row starting from a first resource unit of the slot in the time domain.

The mapping may continue until each part of the information has been mapped to a respective resource unit of the slot or until a respective part of the information has been mapped to each resource unit of the slot. Furthermore, the mapping may be carried out in respect of all rows of the subframe 20 or in respect of a subset of rows of the subframe 20.

In the present embodiment, each modulation symbol includes a number of bits corresponding to a selected modulation scheme for transmitting the modulation symbols. Alternatively, one modulation symbol may be mapped to each resource unit.

In process S12 of FIG. 5, the control section 110 maps the PUSCH modulation symbols onto the resource units of both the first and second slot 21, 22 of the allocated subframe 20.

By way of example the mapping onto both the first and second slots 21, 22 may, as in the present embodiment, be performed in a second time-first mapping which is different from the first time-first mapping (which is used in mapping the CQI modulation symbols). The PUSCH modulation symbols may be mapped from the first resource unit of the first slot in a time-first mapping which first follows the time direction of both the first and second slot and then follows the frequency direction of the allocated frequency resource of the allocated subframe. That is, the second time-first mapping may follow the time direction of the first and the second slot 21, 22 and the frequency direction of the allocated frequency resource of the subframe 20 so that the PUSCH modulation symbols are mapped across the subframe 20 while skipping resource units used for the UCI mapping.

By way of alternative, the PUSCH modulation symbols formed by concatenation of the modulation symbols of one or more code blocks, CBs, of one transport block, TB.

By way of alternative, the PUSCH modulation symbols may be formed by the modulation symbols of one or more CBs of one TB, and the amount of the resource units for mapping the modulation symbols of each CB of the PUSCH may be the same or almost the same; and/or, the amount of resource units on the first slot and that on the second slot for mapping the modulation symbols of each CB of the PUSCH are the same or almost the same. That is, the second time-first mapping, for each of the CBs, first follows the time direction of the second slot 22 and then follows the frequency direction of the allocated frequency resource of the subframe 20, and subsequently follows the time direction of the first slot 21 and then follows the frequency direction of the allocated frequency resource of the subframe 20.

By way of example, the plurality of PUSCH coded bits may form one or more PUSCH code blocks, CBs, (CB #0, CB #1, CB #2) of one transport block, TB. That is, the plurality of PUSCH coded bits may form a single PUSCH CB or a plurality of PUSCH CBs of one TB. In general, mapping information (for example, the PUSCH coded bits of each of a plurality of PUSCH CBs) onto both the first and second slots 21, 22 may ensure that, for each PUSCH CB, part of the data of that PUSCH CB is mapped to the first slot 21 and part of the data of that PUSCH CB is mapped to the second slot 22.

By way of example, mapping information onto both the first and second slots 21, 22 may comprise modifying the procedure discussed above in relation to step S10 of FIG. 5 such that, for each row of the matrix corresponding to the subframe 20 (or a subset thereof), a part of the information is mapped to each resource unit of the subframe 20 on that row (that is, mapping a part of the information to every available resource unit on a given row of both the first slot 21 and the second slot 22, before mapping parts of the information to resource allocation units on a subsequent row).

Additionally or alternatively, mapping information onto both the first and second slots 21, 22 may comprise modifying the mapping process discussed in relation to process S10 of FIG. 5 to alternate between mapping information to the columns correspond to the first slot 21 and to the second slot 22. In general, alternating may imply that parts of the information to be transmitted are mapped to both slots before parts of the information have been mapped to all of the resource units of either slot.

The control section 110 of the UE 100 may be configured not to map the PUSCH modulation symbols to resource units to which the CQI has been or is mapped.

The process of FIG. 5 may further comprise the process of performing a Discrete Fourier Transform, DFT, operation on the mapped UCI and PUSCH modulation symbols for each column.

Additionally or alternatively, the process of FIG. 5 may further comprise the process of calculating an amount of resource units for the CQI modulation symbols, prior to mapping the UCI onto the second slot. Accordingly, the CQI modulation symbols may be mapped onto the resource units of the second slot 22 of the allocated subframe 20 with an amount of mapped resource units equal to the amount of the calculated resource units.

As is apparent from the preceding description of the operations performed by the UE 100, by mapping the PUSCH modulation symbols onto both the first and second slots 21, 22 in a second time-first mapping, process of FIG. 5 enables the UE 100 to map, for a given TB including one or more CBs, each CB of that TB onto both the first slot 21 and the second slot 22 of the candidate subframe 20. Accordingly, the process of FIG. 5 may solve the problem discussed above in relation to conventional systems.

In particular, in the example embodiment described above and the further embodiments described below, mechanism(s) are provided to enable the UE 100 to map PUSCH modulation symbols such that each CB of one TB is mapped onto both the first slot 21 and the second slot 22 of the candidate subframe 20 for the case that one PUSCH TB includes a single CB or multiple CBs. Based on this mechanism, if the UE 100 has to transmit the PUSCH at the second slot 22 due to the channel access failure at the first slot 21, the radio base station 200 may also correctly decode each CB since it can receive at least partial information of each CB (in some embodiments the eNB can receive the important part information, e.g., the system information, of each CB). Hence there is some possibility that the radio base station 200 could successfully demodulate the PUSCH in this case.

Accordingly, the UE 100 may, as in the present embodiment, be further configured to performing listen before talk, LBT, in respect of a frequency channel prior to a first candidate starting point for transmission and to transmit the mapped PUSCH and the mapped UCI from the first candidate starting point, in a case where it is determined that the channel is available. Furthermore in a case where it is determined that the channel is unavailable, the UE 100 may be further perform listen before talk, LBT, in respect of the frequency channel prior to a second candidate starting point for transmission and, in a case where it is determined that the channel is available, to transmit the mapped PUSCH and the mapped UCI from the second candidate starting point.

By way of example, the first candidate starting point for transmission may be located at a boundary of the first slot in the time domain and the second candidate starting point for transmission may be located at a boundary of the second slot in the time domain. Alternatively, the first candidate starting point for transmission may not be located at a boundary of the first slot in the time domain and the second candidate starting point for transmission may not be located at a boundary of the second slot in the time domain.

The process of FIG. 5 and any additions thereto and alterations thereof (and, thus, any of the mapping results discussed below in relation to FIGS. 6A-6D) may be implemented be any suitable means. By way of example, the process of FIG. 5 may be implemented by the UE 100. Alternatively, the process of FIG. 5 may be implemented by a computer program comprising instructions, which, when executed by a computer, cause the computer to perform the process of FIG. 5. Such a computer program may be stored on a non-transitory computer-readable storage medium or carried by a signal. By way of further alternative, the process of FIG. 5 may be implemented by mobile computing device comprising a processor and a memory, wherein the memory is configured to store instructions which, when executed by the processor, cause the processor to perform the process of FIG. 5.

FIGS. 6A to 6D are schematic illustrations showing a method for modulation symbol mapping, according to an example aspects herein.

The PUSCH modulation symbols may, as in the embodiments of FIGS. 6A to 6D, form a plurality of CBs CB #0, CB #1, CB #2 of one TB. However, this is not limiting and the coded bits may form a single CB of one TB or be organised in any other suitable manner known in the art.

The subframe 20 may be represented by a matrix of resource units, as shown in the embodiments of FIGS. 6A to 6D, corresponding to a part of an uplink resource grid comprising time and frequency resources which may be allocated to uplink transmission. As an example, the subframe 20 may, as in the embodiments of FIGS. 6A to 6D, be a subframe comprising two slots 21 and 22, each of which comprises 7 symbols in time domain and 10 subcarriers or resource elements in the frequency domain.

Alternatively, the subframe may be a subframe of any telecommunications standard, including—but not limited to—LTE, LTE-A, UMTS, 3G, 4G, 5G. By way of further alternative, the subframe 20 may comprise three or more slots. Furthermore, in some embodiments, each of the slots may comprise 2, 4, 7, 14, or any other suitable number of symbols in time domain and/or each of the slots may comprise 12, 24, or any other suitable number of subcarriers or resource elements in the frequency domain.

The mapping may, as in the embodiments of FIGS. 6A to 6D, comprise mapping the CQI modulation symbols 26 and the PUSCH modulation symbols onto resource units corresponding to resource elements, REs, of a subframe. Alternatively, the mapping of FIGS. 6A to 6D may be adapted to allow mapping of the CQI modulation symbols 26 and the PUSCH modulation symbols onto resource units representing resource allocation units of an allocation subframe of any telecommunications standard, including—but not limited to—LTE, LTE-A, UMTS, 3G, 4G, 5G.

In addition, the candidate starting points 23, 24 may, as in the embodiments of FIGS. 6A to 6D, be located at the boundaries of the first and second slot 21, 22. Alternatively, the candidate starting points 23, 24 may be located at the boundaries of any symbols during a slot. Alternatively, the candidate starting points 23, 24 may be located at any point during a slot.

Furthermore, in the embodiments of FIGS. 6A to 6D, a PUSCH Demodulation Reference Signal (DMRS) 25 is transmitted in the fourth symbol of each slot (i.e., symbol #3 in one slot) for all the allocated frequency RB(s) and therefore, for both slots 21 and 22, DMRS is shown as mapped to the fourth resource unit of each row of the illustrated matrix, or the illustrated matrix does not comprising the columns for DMRS symbols. That is, the UE 100 may, as in the embodiments of FIGS. 6A to 6D, be configured to transmit PUSCH DMRS during the fourth symbol of each slot 21, 22 of the subframe 20 on all allocated subcarriers. Alternatively, a PUSCH DMRS 25 may be mapped to the second symbol of each slot for all allocated subcarriers or mapped to any other suitable symbol and allocated subcarriers.

By way of further alternative, the UCI 26 may, as in the embodiment of FIGS. 6A to 6D, comprise CQI (Channel Quality Indicator and/or Precoding Matrix Indicator). Alternatively, the UCI 26 may comprise, by way of example, at least one of a SR; a HARQ ACK or a HARQ NACK; a channel quality indicator, a precoding matrix indicator, and a rank indication. Furthermore, the mapping may, as in the embodiment of FIGS. 6A to 6D, be performed before a DFT operation is performed, in a case in which a DFT operation is to be performed.

Note that a matrix of resource units corresponding to the allocated resource elements of the allocated subframe is assumed for CQI and PUSCH mapping, the rows of the matrix corresponding to the allocated subcarriers of the allocated subframe, the columns of the matrix corresponding to the allocated data symbols of the allocated subframe. Further, the columns of the matrix comprising the first column set corresponding to the allocated data symbols on the first slot of the allocated subframe and the second column set corresponding to the allocated data symbols on the second slot of the allocated subframe.

First Example Mapping

FIG. 6A illustrates a first example mapping result according to an exemplary embodiment herein. Accordingly, the UE 100 of FIG. 4 may achieve this mapping result through the following implementations. It is noted that those implementations could be applied in the following order, or in some other order, or some of them may be omitted.

1) According to a first step, the UE 100 calculates the resource amount for CQI 26. In the embodiment of FIG. 6A the resource amount is 15 resource units CQI_0, . . . , CQI_14.

2) Then, the UE 100 maps the CQI modulation symbols 26 onto resource units of the second column set 22 of the illustrated matrix. As illustrated in FIG. 6A CQI may be mapped from the first resource unit (CQI_0) of the first column of the second column set 22 in an order which first follows the column of the second column set 22 and then follows the row of the illustrated matrix 20.

3) The UE 100 then maps the PUSCH modulation symbols of PUSCH CBs (here, CB #0, CB #1, CB #2) onto resource units of the illustrated matrix. PUSCH modulation symbols are mapped from the first resource unit (CB #0_0) of the first column of the first column set, in a second order which first follows the column of the illustrated matrix 20, i.e. across both the first column set 21 and the second column set 21, and then follows the row of the illustrated matrix 20.

When the mapping comes across resource units CQI_0, . . . , CQI_14 which should be/have been used for CQI mapping, the UE 100 should skip these resource units CQI_0, . . . , CQI_14 when performing the PUSCH mapping, as illustrated in FIG. 6A.

Second Example Mapping

FIG. 6B illustrates a second example mapping result according to an exemplary embodiment herein. The UE 100 may achieve this mapping result through the following implementations. It is noted that those implementations could be applied in the following order, or in some other order, or some of them may be omitted.

1) According to a first step, the UE 100 calculates the resource amount for CQI 26. In the embodiment of FIG. 6B the resource amount is 15 resource units CQI_0, . . . , CQI_14.

2) Then, the UE 100 maps the CQI modulation symbols 26 onto resource units of the second column set 22 of the illustrated matrix. As illustrated in FIG. 6B, CQI may be mapped from the first resource unit (CQI_0) of the first column of the second column set 22 in an order which first follows the column of the second column set 22 and then follows the row of the illustrated matrix 20.

3) Then, in contrast to the first example mapping result described in relation to FIG. 6A, the UE 100 may calculate the resource amount (here, CB #0_0, . . . , CB #0_35; CB #1_0, . . . , CB #1_35; CB #2_0, . . . , CB #2_35) for the PUSCH modulation symbols of each CB (here, CB #0, CB #1, CB #2) of the plurality of PUSCH CBs based on a principle mechanism that the same or almost the same resource units (corresponding to a number of REs) on each column set 21, 22 (and thus, on each of the first and second slot) should be allocated to each CB, or the PUSCH CBs should be mapped such that a same ratio of resource units (corresponding to a number of REs) between each column set 21, 22 is maintained for each CB.

Such a resource calculation should exclude CQI resources CQI_0, . . . , CQI_14.

By way of non-limiting example, as illustrated in FIG. 6B, fifteen resource units are allocated for each of CB #0, CB #1, and CB #2 respectively in the second column set 22 of the illustrated matrix and twenty resource units are allocated for each of CB #0, CB #1, and CB #2 respectively in the first column set 21 of the illustrated matrix.

4) Then, the UE may map the PUSCH modulation symbols of the PUSCH CBs (here, CB #0, CB #1, CB #2) onto resource units of the illustrated matrix 20 in accordance with the resource amounts calculated in step 3. The PUSCH modulation symbols of the PUSCH CBs are mapped to the calculated resource amounts of each column set 21, 22 and within each column set 21, 22, for the PUSCH modulation symbols of the PUSCH CBs, mapping is performed in an order which first follows the column of one column set and then follows the row of the illustrated matrix. Such a mapping could start with the first column set 21 first and the second column set 22 second, or in reverse.

More generally, the UE 100 may then map the PUSCH modulation symbols of the plurality of PUSCH CBs onto both the first and second slot 21, 22 by mapping the PUSCH modulation symbols in a second order which, for each of the PUSCH CBs CB #0, CB #1, CB #2, first follows the column of the second column set 22 and then follows the row of the illustrated matrix 20, and subsequently follows the column of the first column set 21 and then follows the row of the illustrated matrix 20. By way of example, the UE 100 may map the PUSCH modulation symbols of plurality of PUSCH CBs, for each of the first and second column set 21, 22, in an order which first follows the column of that column set and then follows the row of that illustrated matrix, starting from the first available resource unit (in this example, CB #0_0) of the second column set 22.

The UE 100 may, as in the present embodiment, map the PUSCH CBs CB #0, CB #1, CB #2 to the first and second column sets 21, 22 such that the same or almost the same number of resource units on each column set (and this, on each slot for transmission) are allocated to each CB, or such that a same ratio of a number of resource units allocated on the first column set 21 of the illustrated matrix 20 to a number of resource units allocated on the second column set 22 of the illustrated matrix 20 is maintained for each CB CB #0, CB #1, CB #.

By way of non-limiting example, CB #0, CB #1, and CB #2 may, as shown in FIG. 6B, be firstly mapped onto the second column set 22 of the illustrated matrix 20 after CQI 26, and then mapped onto the first column set 21 of the illustrated matrix 20. Such a mapping may be advantageous in that it may enhance transmission performance because this mechanism may map most of the system bits on the second column set 22, and thus to the second slot 22, where the second slot 22 has more transmission opportunities, and therefore a higher transmission probability, than the first slot 21.

Third Example Mapping

Figure 6C:
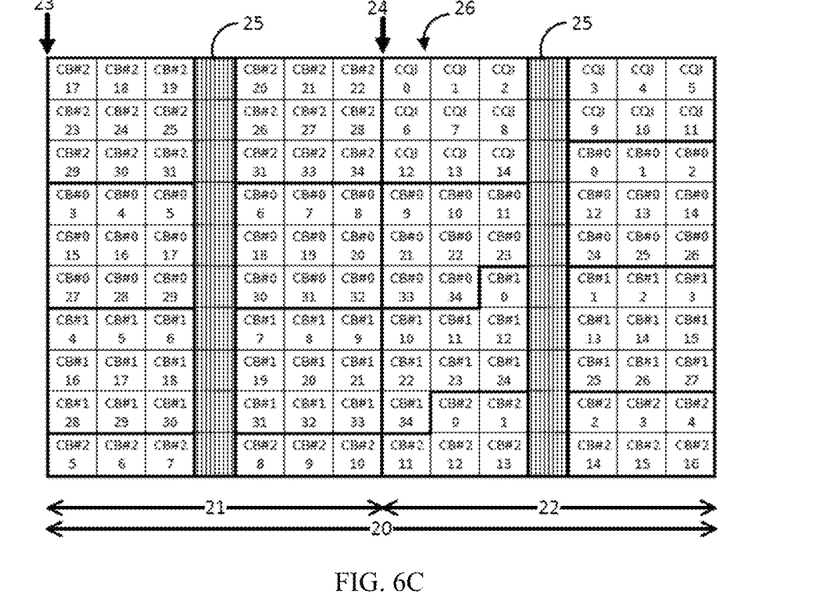

FIG. 6C illustrates a third example mapping result according to an exemplary embodiment herein. The UE 100 may achieve this mapping result through the following implementations. It is noted that those implementations could be applied in the following order, or in some other order, or some of them may be omitted.

1) According to a first step, the UE 100 calculates the resource amount for CQI 26. In the embodiment of FIG. 6C the resource amount is 15 resource units CQI_0, . . . , CQI_14.

2) Then, the UE 100 maps the CQI modulation symbols 26 onto resource units of the second column set 22 of the illustrated matrix 20. As illustrated in FIG. 6C, CQI may be mapped from the first resource unit (CQI_0) of the first column of the second column set 22 in an order which first follows the column of the second column set 22 and then follows the row of the illustrated matrix 20.

3) Then, in contrast to the first and second example mapping results described above in relation to FIGS. 6A and 6B respectively, the UE 100 may map the PUSCH modulation symbols of the PUSCH CBs (here, CB #0, CB #1, CB #2) onto resource units of the illustrated matrix 20, whereby PUSCH modulation symbols of the PUSCH CBs are mapped starting from the first resource unit CB #0_0 of a first column on the second column set 22 after the CQI mapping in an order which first follows the column of the illustrated matrix 20 and then follows the row of the illustrated matrix 20.

4) After finishing the mapping of the last resource unit CB #2_16 of the second column set 22, the UE may be configured to map the remaining PUSCH modulation symbols of the plurality of PUSCH modulation symbols of the PUSCH CBs CB #0, CB #1, CB #2 in this order onto remaining resource units CB #2_17, . . . , CB #2_34 of the first column set 21 of the illustrated matrix 20, starting from the first resource unit CB #2_17 of a first column of the first column set 21, until the mapping is finished. The remaining available resource units CB #2_17, . . . , CB #2_34 of the first column set 21 correspond, in the frequency domain, to the rows of resource units of the second column set 22 onto which the CQI 26 has previously been mapped.

[Fourth Example Mapping]

Figure 6D:
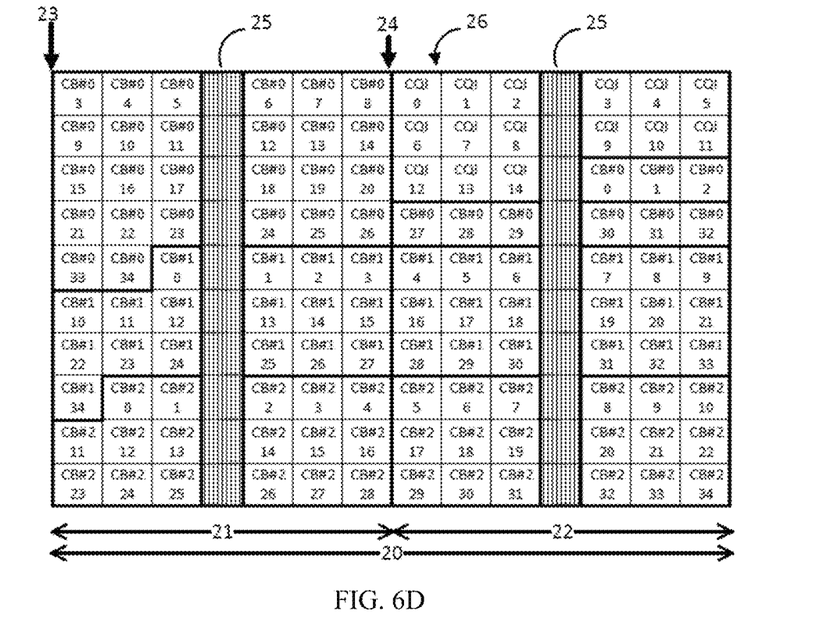

FIG. 6D illustrates a fourth example mapping result according to an exemplary embodiment herein. The UE 100 may achieve this mapping result through the following implementations. It is noted that those implementations could be applied in the following order, or in some other order, or some of them may be omitted.

1) According to a first step, the UE 100 calculates the resource amount for CQI 26. In the embodiment of FIG. 6B the resource amount is 15 resource units CQI_0, . . . , CQI_14.

2) Then, the UE 100 maps the CQI modulation symbols 26 onto resource units of the second column set 22 of the illustrated matrix 20. As illustrated in FIG. 6D, CQI 26 may be mapped from the first resource unit (CQI_0) of the first column of the second column set 22 in an order which first follows the column of the second column set 22 and then follows the row of the second column set 22/illustrated matrix 20.

3) Then, the UE 100 may, as in the present embodiment, be configured to map the PUSCH modulation symbols of the PUSCH CBs CB #0, CB #1, CB #2, onto the resource units of the illustrated matrix 20 starting from a first resource unit of the first column the second column set 22 after the UCI mapping, to each resource unit on a row comprising a last resource unit of the CQI mapping.

That is, the UE 100 maps the PUSCH modulation symbols of the PUSCH CBs (here, CB #0, CB #1, CB #2) on the candidate subframe 20, whereby the mapping of PUSCH modulation symbols of the PUSCH CBs CB #0, CB #1, CB #2 is firstly started on the row (that is, a row in the matrix 20 illustrated in FIG. 6D and corresponding to an allocated frequency resource) at which the CQI mapping has finished on the second column set 22 (i.e. a PUSCH CB (here CB #0). Mapping starts directly following the last resource unit CQI_14 of the CQI mapping, optionally with a demodulation reference signal (DRMS) therebetween as illustrated in FIG. 6D) until all resource units on that row in the second column set 22 have been allocated. In the example of FIG. 6D, PUSCH modulation symbols of the PUSCH CBs are mapped to resource units CB #0_0, CB #0_1, CB #0_2 in this step.

4) Then, the UE 100 may be further configured to map the PUSCH modulation symbols of the PUSCH CBs CB #0, CB #1, CB #2, starting from a first resource unit of the first column of the first column set 21, to available resource units of the first column set 21 and the second column set 22 in an order which first follows the column of the illustrated matrix 20 and then follows the row of the illustrated matrix 20.

That is, the mapping is continued from the first resource unit CB #03 of the first column of the firstcolumn set 21 in an order which first follows the columns across the whole illustrated matrix 20 and then follows the rows of the illustrated 20. When the mapping comes across unavailable resource units, for example those CQI_0, . . . , CQI_14 which should be/have been used for CQI mapping, the PUSCH mapping should skip these resource units.

As is apparent from the preceding description of the operations performed by the UE 100, by mapping the PUSCH modulation symbols of each of the plurality of PUSCH CBs onto both the first and second column sets 21, 22 in the illustrated matrix 20 (and therefore to both of the corresponding first and second slots 21 and 22) in accordance with a mapping as illustrated in any one of FIGS. 6A-6D, the UE 100 is able to map each CB of one TB onto both the first slot 21 and the second slot 22 of the candidate subframe 20 for transmission for the case that one PUSCH TB includes multiple CBs. Accordingly, the problem discussed in the background section in relation to conventional systems may be avoided.

Figure 7:
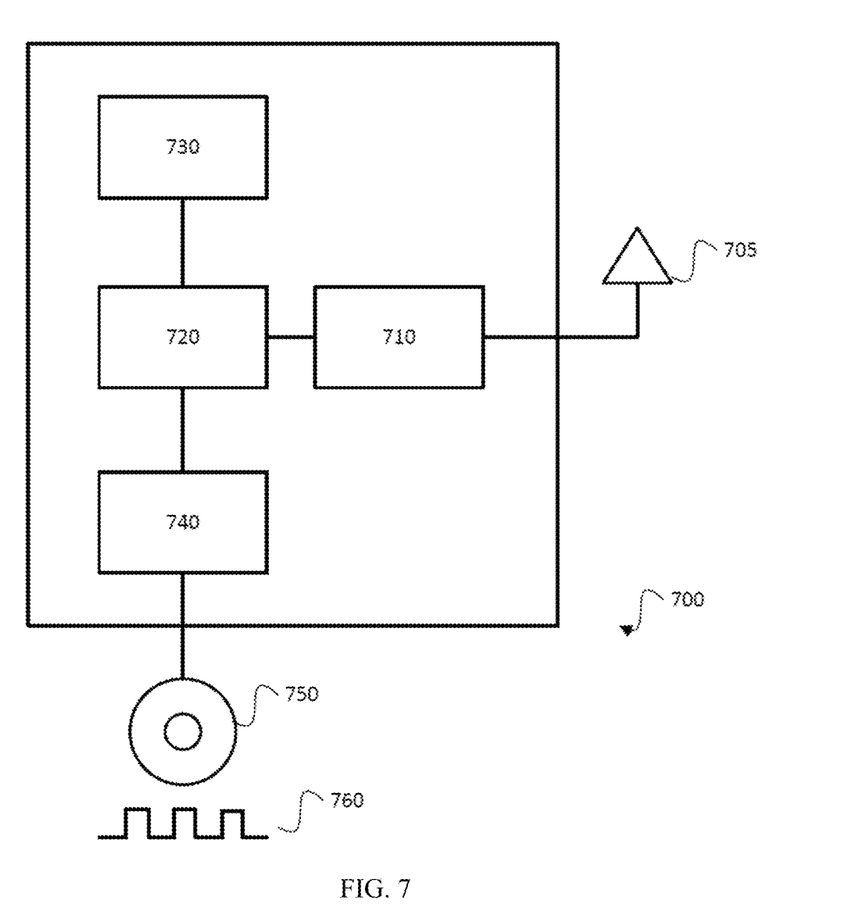
FIG. 7 is a block diagram illustrating an example signal processing hardware configuration of the user equipment 100 of FIG. 4, according to an example aspect herein.

FIG. 7 is a block diagram illustrating an example signal processing hardware configuration 700 of the user equipment 100 of FIG. 4, according to an example embodiment herein. The programmable signal processing hardware 700 of FIG. 7 may, as in the present example embodiment, be configured to function as UE 100 of FIG. 4. It should be noted, however, that the UE 100 of FIG. 4 may alternatively be implemented in non-programmable hardware, such as an application-specific integrated circuit (ASIC) or in any other suitable manner, using any suitable combination of hardware and software components, such that the UE 100 comprises processing and communication functionalities necessary to operate in accordance with one or more conventional telecommunication standards, including—but not limited to—LTE, LTE-A, UMTS, 3G, 4G, 5G.

The programmable signal processing hardware 700 comprises a transmitting/receiving section 710 and one or more antennae 705. The signal processing apparatus 700 further comprises a control section (by way of example, a processor, such as a Central Processing Unit, CPU, or Graphics Processing Unit, GPU) 720, a working memory 730 (e.g. a random access memory) and an instruction store 740 storing the computer-readable instructions which, when executed by the control section 720, cause the processor 720 to perform the functions of the UE 100 of FIG. 4.

The instruction store 740 may comprise a ROM (e.g. in the form of an electrically-erasable programmable read-only memory (EEPROM) or flash memory) which is pre-loaded with the computer-readable instructions. Alternatively, the instruction store 740 may comprise a RAM or similar type of memory, and the computer-readable instructions of the computer program can be input thereto from a computer program product, such as a non-transitory, computer-readable storage medium 750 in the form of a CD-ROM, DVD-ROM, etc. or a computer-readable signal 760 carrying the computer-readable instructions.

Figure 8:
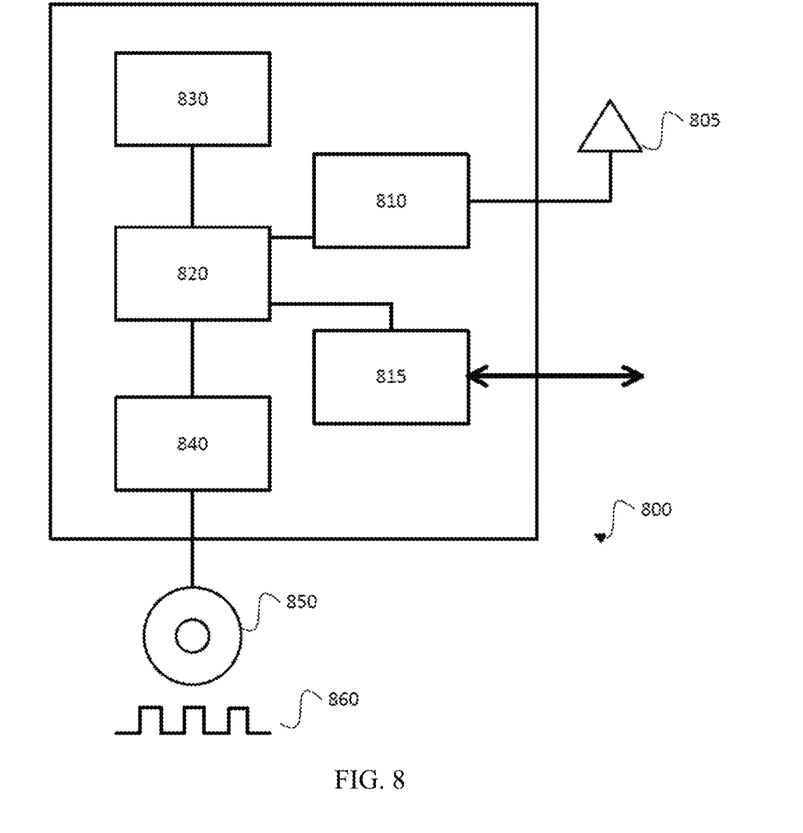
FIG. 8 is a block diagram illustrating an example signal processing hardware configuration of the radio base station 200 of FIG. 4, according to an example aspect herein.

FIG. 8 is a block diagram illustrating an example signal processing hardware configuration 800 of the radio base station 200 of FIG. 4, according to an example embodiment herein. The programmable signal processing hardware 800 of FIG. 4 may, as in the present example embodiment, be configured to function as radio base station 200 of FIG. 4. It should be noted, however, that the radio base station 200 may alternatively be implemented in non-programmable hardware, such as an application-specific integrated circuit (ASIC) or in any other suitable manner, using any suitable combination of hardware and software components, such that the radio base station 200 comprises processing and communication functionalities necessary to operate in accordance with one or more conventional telecommunication standards, including—but not limited to—LTE, LTE-A, UMTS, 3G, 4G, 5G.

The programmable signal processing hardware 800 comprises a transmitting/receiving section 810 and one or more antennae 805. The signal processing apparatus 800 further comprises a network communication interface 815, a control section (by way of example, a processor, such as a Central Processing Unit, CPU, or Graphics Processing Unit, GPU) 820, a working memory 830 (e.g. a random access memory) and an instruction store 840 storing the computer-readable instructions which, when executed by the control section 820, cause the processor 820 to perform the functions of the radio base station 200 of FIG. 4.

The instruction store 840 may comprise a ROM (e.g. in the form of an electrically-erasable programmable read-only memory (EEPROM) or flash memory) which is pre-loaded with the computer-readable instructions. Alternatively, the instruction store 840 may comprise a RAM or similar type of memory, and the computer-readable instructions of the computer program can be input thereto from a computer program product, such as a non-transitory, computer-readable storage medium 850 in the form of a CD-ROM, DVD-ROM, etc. or a computer-readable signal 860 carrying the computer-readable instructions.

Although detailed embodiments have been described, they only serve to provide a better understanding of the invention defined by the independent claims, and are not to be seen as limiting.

What is claimed is:

1. A method for mapping modulation symbol to perform transmission on at least one unlicensed carrier, the method comprising:
   mapping a channel quality information, CQI, modulation symbols onto resource units of a second slot of an allocated subframe, wherein the CQI modulation symbols are mapped from a first resource unit of the second slot in a time-first mapping; and
   mapping a Physical Uplink Shared Channel, PUSCH, modulation symbols from a first resource unit of a first slot in a time-first mapping which first follows a time direction of both the first slot and the second slot and then follows a frequency direction of the allocated frequency resource of the allocated subframe.

2. The method of claim 1, wherein the PUSCH modulation symbols are mapped from the first resource unit of the first slot in a time-first mapping while skipping the resource units used for the CQI mapping.

3. The method of claim 1, wherein the CQI modulation symbols are mapped in a time-first mapping which first follows a time direction of the second slot and then follows a frequency direction of allocated frequency resource of the allocated subframe.

4. The method of claim 1, further comprising:
   calculating an amount of resource units for the CQI modulation symbols.

5. The method of claim 4, wherein the CQI modulation symbols are mapped onto the resource units of the second slot of the allocated subframe with an amount of mapped resource units equals to the amount of the calculated resource units.

6. The method of claim 1, wherein the PUSCH modulation symbols formed by concatenation of the modulation symbols of one or more code blocks, CBs, of one transport block, TB.

7. A user equipment, UE, for mapping modulation symbol to perform transmission on at least one unlicensed carrier, the user equipment comprising:
   a memory; and
   a processor,
   wherein the memory stores one or more computer programs that, when executed by the processor, cause the processor to:
   map a channel quality information, CQI, modulation symbols onto resource units of a second slot of an allocated subframe, wherein the CQI modulation symbols are mapped from a first resource unit of the second slot in a time-first mapping; and
   map a Physical Uplink Shared Channel, PUSCH, modulation symbols from a first resource unit of a first slot in a time-first mapping which first follows a time direction of both the first slot and the second slot and then follows a frequency direction of the allocated frequency resource of the allocated subframe.

8. The UE of claim 7, wherein the processor is configured to perform the mapping of the PUSCH modulation symbols from the first resource unit of the first slot in a time-first mapping while skipping the resource units used for the CQI mapping.

9. The UE of claim 7, wherein the processor is configured to perform the mapping of the CQI modulation symbols in a time-first mapping which first follows a time direction of the second slot and then follows a frequency direction of allocated frequency resource of the allocated subframe.

10. The UE of claim 7, wherein the processor is configured to calculate an amount of resource units for the CQI modulation symbols.

11. The UE of claim 7, wherein the processor is configured to map the CQI modulation symbols onto the resource units of the second slot of the allocated subframe with an amount of mapped resource units equal to an amount of calculated resource units.

12. The UE of claim 7, wherein the PUSCH modulation symbols formed by concatenation of the modulation symbols of one or more code blocks, CBs, of one transport block, TB.

* * * * *